Feb. 4, 1941. A. H. HABERSTUMP 2,230,324
VEHICLE BODY
Original Filed Dec. 4, 1933  2 Sheets-Sheet 1
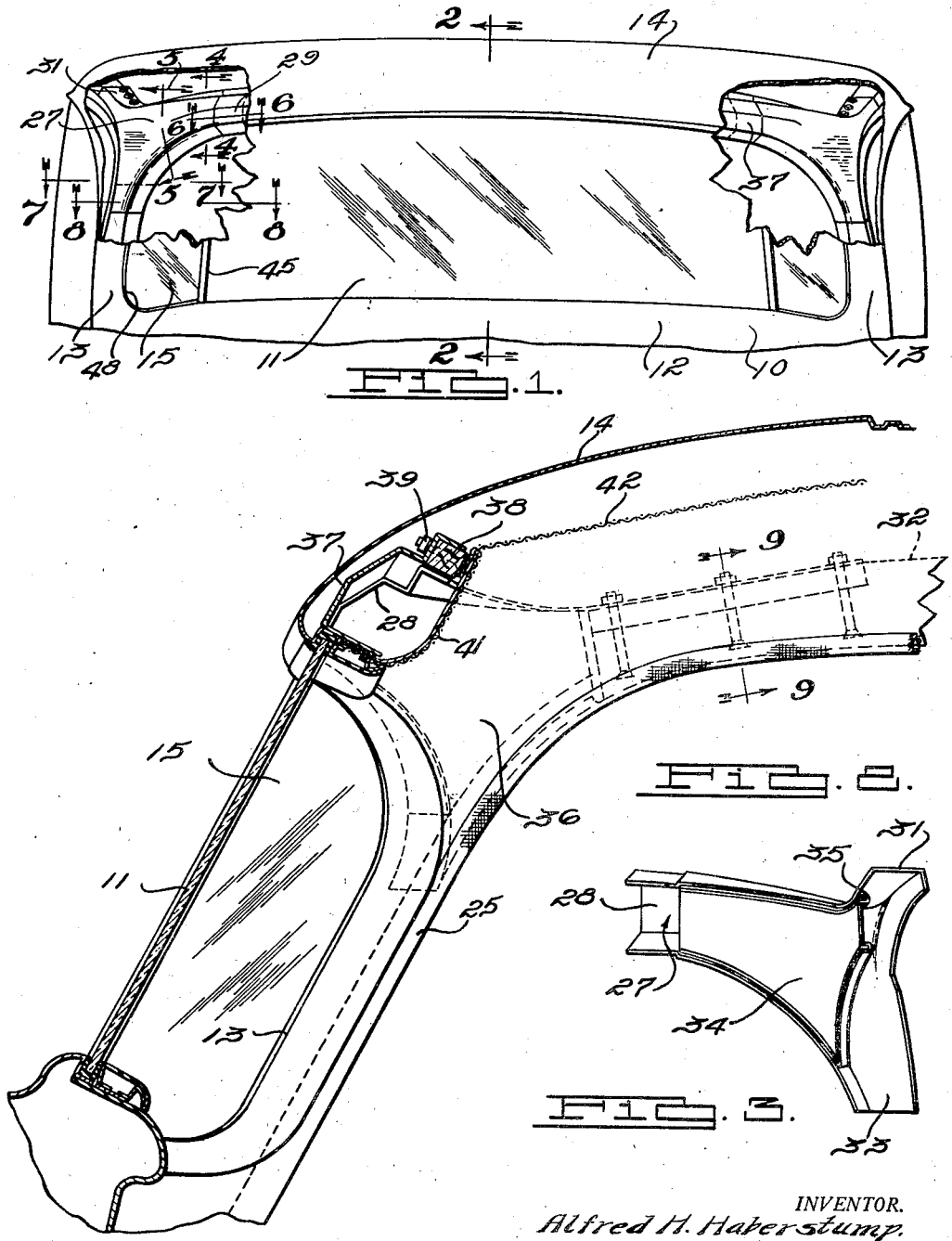
INVENTOR.
Alfred H. Haberstump.
BY
Harness, Dickey, Pierce & Hann.
ATTORNEYS.

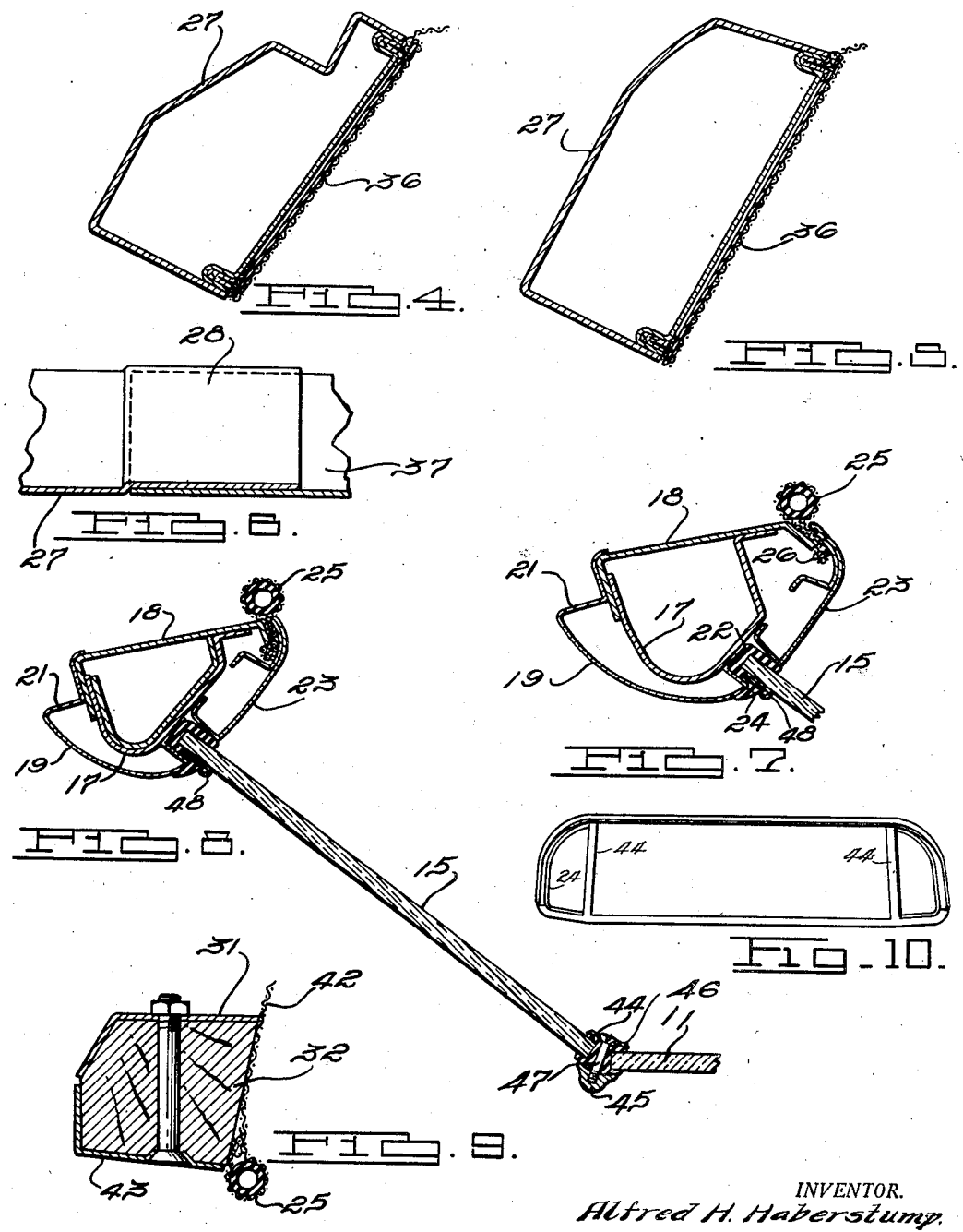

Patented Feb. 4, 1941

2,230,324

UNITED STATES PATENT OFFICE 2,230,324

VEHICLE BODY

Alfred H. Haberstump, Detroit, Mich., assignor to The Murray Corporation of America, a corporation of Delaware Original application December 4, 1933, Serial No. 700,793. Divided and this application August 9, 1935, Serial No. 35,427

7 Claims. (Cl. 296—84)

This invention is a division of application Serial No. 700,793, filed December 4, 1933, Patent No. 2,082,830, dated June 8, 1937, and relates to vehicle bodies and particularly to the header and front pillar construction therefor which effects the streamlining of the front top portion of the vehicle body.

The trend in the automobile vehicle body art is turning more and more toward the streamlining of the body to cut down the wind resistance and increase the speed of the vehicle without the necessity of materially increasing the engine horse power. The present construction permits the material sloping of the windshield glass toward the rear and the sides of the vehicle to eliminate as much as possible the square front section which offered material resistance to the wind and the speed of the automobile.

In practicing my invention, I provide pillar reinforcing elements upon which triangularly shaped corner elements are secured and are rounded therefrom to connect with the top cross header and the top side rails of the vehicle body. In this manner a frame is formed upon which the paneling may be disposed which retains the strength required in the body and at the same time permits the body to be shaped to have streamlined features. Heretofore the cross header, pillar and top rail were joined at the point of meeting but since the body is to be curved in varied directions the elements will not meet at a common point. If curved to provide such a meeting point, it is not believed that strength could be provided between the elements as produced by the unit corner elements having the three branches which join the pillar, the header and rail together.

Accordingly, the main objects of my invention are to provide rounded elements for joining the header, the pillar and the top rails to the vehicle body to form a unit structure; to provide a frame for a vehicle body wherein the corner portions are rounded and provided with branches for connecting the various elements of the frame; to provide a header for a vehicle body which is joined at each end to a corner portion having rearwardly extending and downwardly extending branches for joining respectively with the top rails and the pillars of the body; to provide paneling for encompassing the framing of the body which curves toward the top and the sides of the vehicle; to provide a windshield which slopes rearwardly and extends only partially across the vehicle and joined with two side windshield portions which follow the sidewardly sloping contour of the vehicle body; and, in general, to provide elements for constructing the front top portion of a vehicle body which streamlines the body, provides additional visibility thereto and which enhances the appearance of the vehicle.

Other objects and features of novelty of my invention will be either specifically pointed out or will become apparent when referring, for a better understanding of my invention, to the following description taken in conjunction with the accompanying drawings, wherein:

Figure 1 is a broken view of a front top portion of a vehicle body embodying features of my invention, Fig. 2 is an enlarged sectional view of the structure illustrated in Fig. 1, taken on the line 2—2 thereof, Fig. 3 is a perspective view of a corner element employed in the structure illustrated in Figs. 1 and 2, Fig. 4 is an enlarged sectional view of the structure illustrated in Fig. 1, taken on the line 4—4 thereof, Fig. 5 is an enlarged sectional view of the structure illustrated in Fig. 1, taken on the line 5—5 thereof, Fig. 6 is an enlarged sectional view of the structure illustrated in Fig. 1, taken on the line 6—6 thereof, Fig. 7 is an enlarged sectional view of the structure illustrated in Fig. 1, taken on the line 7—7 thereof, Fig. 8 is an enlarged sectional view of the structure illustrated in Fig. 1, taken on the line 8—8 thereof, Fig. 9 is an enlarged sectional view of the structure illustrated in Fig. 2, taken on the line 9—9 thereof, and Figure 10 is a plan view of the unitary sealing strip surrounding the sections of glass which form the windshield.

Referring to Fig. 1, I have illustrated a vehicle body 10 having a windshield 11 therein, the marginal edges of which are defined by a cowl panel 12, side pillar panels 13 and a top panel 14. In Fig. 2 it will be noted that the side pillar panels 13 slope rearwardly a material amount and that the windshield is divided having two side portions 15 which also slope toward the sides of the vehicle body.

The body is constructed by providing pillar reinforcing elements, illustrated more particularly in Figs. 7 and 8, comprising a channel shaped element 17 which forms a box section with a door jamb portion 18, the outer portion of which is covered by a pillar finish element 19. The rabbet 21 is provided in the panel 19 for the door while a rabbet 22 is provided in the opposite edge to receive the windshield side portions 15 which are removably retained therein by an inner finish molding 23.

A rubber cushioning and sealing strip 24 is provided in the rabbet 22 to encompass the edge of the glass and retain it sealed therein against shock and the entrance of moisture. A suitable door sealing element 25 is disposed adjacent to the inner edge of the door jamb 18, the element being retained in position through the clamping engagement of the molding 23 and the flange on the door portion 18, which retains a bead 26 on the inner end of the sealing strip against outward movement.

The pillars extend slightly above the mid-horizontal plane of the windshield 11 where they are joined by the corner elements 27 illustrated more particularly in Fig. 3. A corner element 27 is stamped and preformed from a sheet of metal to be provided with a projecting arm portion 28 which engages the header portion 29 of the body, with an oppositely disposed end portion 31 which engages a top rail 32 and with a downwardly extending portion 33 which engages the upper edge of the pillar element 17. A box section is formed in the corner portion by an inner plate 34, the marginal edges of which are U-shaped at 35 to provide a small channel for receiving paper, wood or similar material in which tacks may be driven for holding the finish trim of the vehicle relative to the corner plate 34. In this manner, finish trim 36, as illustrated in Fig. 2, is secured on the corners of the header construction for providing a finish thereto.

A header 37 of channel shape, as illustrated more clearly in Figs. 2, 4 and 5, extends across the front part of the body and is joined at each end to the projecting ends 28 of the corner elements 27. A lap joint is effected, as illustrated more clearly in Fig. 6, the element 28 being shouldered to receive the ends of the header 37. A cross bow 38 is secured, preferably by bolts 39, to a rabbet in the header 37 to add strength to the ends thereof and provide a means by which the finish material 41 and 42 is secured to finish the interior of the vehicle. The edges of the material 41 may abut or lap the material 36 which has been tacked to the corner element 27 or a single piece of material may be employed to extend entirely across the header and the corner elements.

In Fig. 9, I have illustrated a side rail 32 which is secured to the top extension 31 of the corner element 27, preferably by bolts, and it is to be understood that the extension 31 may be so formed as to mate with and be joined to metal rail, preferably the rails illustrated and described in the co-pending application of Otto F. Graebner, filed July 22, 1932, Serial No. 624,031, and assigned to the assignee of the present invention. The extension 43 of the door rabbet 18 is bolted to the bottom of the rail 32 which retains the extending flange 31 in fixed relation to the rail. It is to be understood that the jamb portion 43 and the flange 31 would mate with and be secured to the side rail by welding or other suitable means if the rail is made of metal. The top finish strip 42 may be tacked directly to the wood rail 32 or when a metal rail is employed other suitable tacking means may be provided.

It will be noted that in this construction the top panel 14 extends outwardly from the side pillars 13, as illustrated more clearly in Fig. 3, to provide a sidewardly directed streamline effect to the front of the body to break up the broad lateral expansion of the windshield which is sloped to direct the air upwardly over the top of the body. In this manner a greater streamline effect is provided which directs the air not only over the top but sidewardly of the body.

The main central windshield portion 11 extends laterally across the front of the vehicle having the two side panel portions 15 sloping rearwardly therefrom. The edges of the glass are retained in the rubber sealing and finish strip 24 while the vertical junction at the lateral edges of the central windshield portion 11 is joined by a resilient element 44 which may have an outer finish element 45 of metal thereover which preferably has a high polish. A metal element 46 is retained against the inner face of the resilient element 44, the two elements 45 and 46 being retained in place by screws 47. A metal bead 48 may cover the rubber element 24 to provide with the elements 45 and 46 a metal finish at the outer edges of all of the glass elements.

The rubber element 24 and strips 44 are preferably constructed as a unit, that is to say, an element 24 having the outline of the front opening as illustrated in Figs. 7 and 8, and having extending medially of the sides the two elements 44 for forming a unit construction. In this manner the windshield portions 11 and 15 are secured together in fixed relation with a cushioning element between all of the edges to resist shock and to seal the edges against the entrance of water.

As a further extension of my invention the central header 37 could be made angularly with the apex disposed in the centerline of the car and the central windshield 11 split through the center and provided with a central strip 44 joining the edges at the center of the vehicle at substantially the same angle as that illustrated between the windshield portions 11 and 15. This construction would deflect part of the central air sidewardly and part upwardly and would be a further advancement over the structure illustrated.

While I have illustrated and described but a single embodiment of my invention, it will be apparent to those skilled in the art that various changes, omissions, additions and substitutions may be made therein without departing from the spirit and scope of my invention, as set forth in the accompanying claims.

I claim as my invention:

1. A vehicle body having a laterally extending windshield and windshield portions sloping rearwardly therefrom at each of its side edges, a unit sealing and buffing strip disposed about the windshield and the two windshield side portions extending therebetween, metal finish strips disposed on the front side of the portion of said strip extending between said windshield and windshield portions, and means engaging said metal finish strip for securing them in position.

2. A vehicle body having a windshield opening therein, at least two transparent windshield elements disposed in said opening, a unit sealing strip of rubber disposed about the opening having a portion spanning said opening, the inner edges of said unit being provided with grooves for receiving the edges and entirely encompassing said windshield elements, and a metal finish member covering said spanning portion of the unit strip between said windshield elements.

3. A vehicle body having a windshield opening therein, at least two transparent windshield elements disposed in said opening, a unit sealing strip of rubber disposed about the opening having a portion spanning said opening, the inner edges of said unit being provided with channels for receiving the edges and entirely encompassing said windshield elements, a metal finish member covering said spanning portion of the unit strip between said windshield elements, and means for releasably securing said metal finish member to said spanning portion.

4. A vehicle body having a windshield opening therein, at least two transparent windshield elements in said opening disposed in angular relation to each other, a unit sealing strip having a portion surrounding said elements and an intermediate portion engaging the adjoining edges thereof to completely seal said elements, and a finish strip disposed over said intermediate portion to provide a finish to the adjacent edges of said windshield elements.

5. A window assembly for an automotive vehicle comprising a pair of fixed glass panels for closing the opening having their adjacent vertical edges spaced, a fixed rubber weatherstrip in the form of a continuous loop surrounding the window opening and sealing the outer edges of the panels and having a homogeneous vertical piece extending from the top to the bottom of the window opening in the gap between adjacent vertical edges of the fixed glass panels for sealing the adjacent vertical edges of these panels.

6. A window assembly for an automotive vehicle comprising a pair of glass panels for closing the opening having their adjacent vertical edges spaced, a rubber weatherstrip in the form of a continuous loop surrounding the window opening and sealing the outer edges of the panels and a vertical weatherstrip extending from the top to the bottom of the window opening in the gap between adjacent vertical edges of the glass panels for sealing the adjacent vertical edges of these panels, and a molding secured to the adjacent edges of the glass panels for securing the vertical weatherstrip in the gap between the adjacent vertical edges of the panels and in weather-tight relation therewith.

7. A window assembly for an automotive vehicle comprising a pair of glass panels for closing the opening having their adjacent vertical edges spaced, a rubber weatherstrip in the form of a continuous loop surrounding the window opening and sealing the outer edges of the panels and a vertical rubber weatherstrip extending from the top to the bottom of the window opening in the gap between adjacent vertical edges of the glass panels for sealing the adjacent vertical edges of these panels, and a molding comprising inside and outside members overlapping the adjacent edges of the panels and the vertical portion of the weatherstrip, and means for securing the said members together whereby the vertical weatherstrip is clamped between and pressed against the adjacent edges of the glass panels to seal the same.

ALFRED H. HABERSTUMP.